A. FRYKMAN.
INDEX HEAD FOR LATHES.
APPLICATION FILED JAN. 28, 1914.
1,108,736.
Patented Aug. 25, 1914.
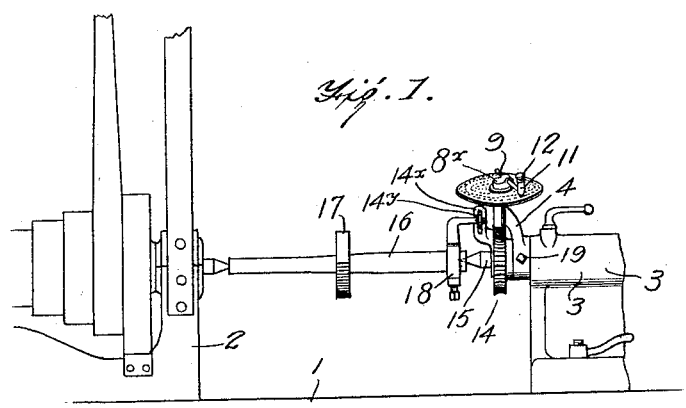
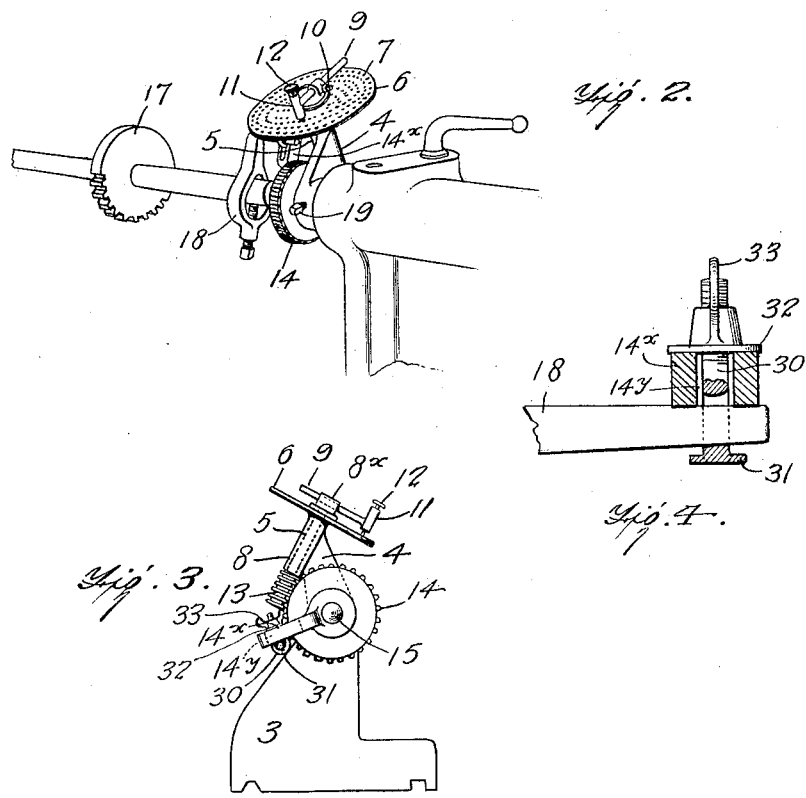
WITNESSES
INVENTOR
AUGUST FRYKMAN,
BY
ATTORNEYS

UNITED STATES PATENT OFFICE.

AUGUST FRYKMAN, OF SOURIS, NORTH DAKOTA.

INDEX-HEAD FOR LATHES.

1,108,736. Specification of Letters Patent. Patented Aug. 25, 1914.

Original application filed October 29, 1912, Serial No. 728,343. Divided and this application filed January 28, 1914. Serial No. 814,952.

*To all whom it may concern:*

Be it known that I, AUGUST FRYKMAN, a citizen of the United States, and a resident of Souris, in the county of Bottineau and State of North Dakota, have made certain new and useful Improvements in Index-Heads for Lathes, of which the following is a specification.

My invention relates to improvements in indexing heads for lathes, and it consists in the combinations, constructions, and arrangements herein described and claimed.

An object of my invention is to provide a device by means of which the work supporting means of lathes which are provided with attachments for milling or cutting key ways may be shifted to predetermined distances and held in its shifted position.

A further object of my invention is to provide an indexing head, of the type described, for shifting the work, and at the same time indicating the distance or amount to which the work has been shifted.

Other objects and advantages will appear in the following specification and the novel features of the device will be particularly pointed out in the appended claim.

My invention is illustrated in the accompanying drawings forming part of this application in which—

Figure 1 is a side view of a portion of a lathe provided with my improved indexing head, Fig. 2 is a perspective view of certain parts shown in Fig. 1, Fig. 3 is an end view of the indexing head, and Fig. 4 is a sectional view of a portion of the device showing the means for connecting the dog.

This application is a division of a prior application 728,343, filed October 29, 1912.

In carrying out my invention I may make use of any suitable form of lathe. The device is designed primarily however for those lathes which are equipped with attachments for milling or for cutting gears or keyways.

Referring now to Fig. 1, I have shown therein a lathe having a body portion 1 upon which is mounted a head stock 2 and a tail stock 3. Mounted upon the tail stock 3 and extending upwardly therefrom is a hanger 4 which is provided with a bearing 5 inclined to the vertical as shown in Fig. 3. Mounted rigidly upon the upper end of this bearing is a gage plate 6, which is provided with a series of concentric rows of openings 7. Extending through the gage plate and bearing is a shaft 8 having an upper portion $8^x$ through which an arm 9 is arranged to slide. The arm may be locked in position by means of a set screw 10 and is provided on one end with a sleeve 11 containing a slidable pawl 12 which is adapted to slip partially into any one of the gage holes with which the gage plate 6 is provided, thus locking the arm in any one of a large number of different angular positions. The rod 5 is provided at its lower end with a worm 13, which is in mesh with a worm wheel 14 mounted upon a spindle 15. This spindle is tapered at one end like a tail center pin, and when in use the tail center pin of the lathe is taken out and the taper pin 15 inserted in its place. It is longer than the usual tail center pin to an extent commensurate with the thickness of the worm wheel 14. The arm $14^x$ is secured to the worm wheel 14 and is provided with a slot $14^y$.

The means for supporting the work is shown in the present instance as a piece of shafting 16. Mounted rigidly upon the shafting is a gear blank 17 which is designed to be cut by any suitable mechanism (not shown) but which forms the subject of the prior application aforesaid. For enabling the worm wheel 14 to control the position of the shaft 16 I mount a dog 18 on the shaft. The tail of the dog extends through an eye bolt 30, which is disposed in the slot $14^y$ of the arm $14^x$. The latter is provided with lugs 31 to prevent the bolt from leaving the arm and with a washer 32. The dog is held by passing it through the eye bolt and then tightening it up with the thumb nut 33. It is obvious that the eye bolt may be moved back and forth in the slot to accommodate dogs of different sizes.

The operation of the device is as follows: The head-stock of the lathe is rendered idle and the taper pin 15 is placed in the position ordinarily occupied by the tail center pin as above described. The shaft 16 carrying the work, which in this case is a gear blank, is now mounted so as to extend from the taper pin at the head stock to the tapered end of the spindle 15. The tail of the dog which is carried by the shaft 16 is fastened as described, and the dog is locked to the shaft by the set screw. The operator by turning the arm or handle 9 to a predetermined extent and lodging the pawl or bolt 12 in the proper hole of the gage plate 6, turns the worm which transmits its movement to the worm wheel, and thence through the medium of the arm 14ˣ and dog 18 to the shaft 16 bearing the work. The shaft 16, which bears the work, is not only moved to its proper position, but is locked in its shifted position. The arm 9 thus serves not only for shifting the work but in conjunction with the pawl or locking bolt 12 serves to retain the parts securely.

I claim:

The combination with a lathe having a head stock and a tail stock, of indexing mechanism therefor comprising a spindle arranged to enter said tail stock and having a tapered end, a work support carried by the head stock at one end and by the tapered end of the spindle at the other, a bracket carried by said tail stock, a bearing carried by said bracket, a shaft disposed in said bearing, a perforated gage plate carried by said bearing, an index arm secured to said shaft and provided with a locking member arranged to enter said gage plate, means connected with said shaft for rotating the work support when the index arm is turned, said last named means comprising a worm carried by said shaft, a gear loosely mounted on said spindle and arranged to mesh with said worm, an arm rigidly secured to said gear and extending laterally therefrom, said arm having a longitudinal slot, an eye bolt disposed in said slot and movable therealong, said eye bolt being arranged to receive the tail of the dog, and means for moving the eye bolt to clamp the dog against said laterally extending arm.

AUGUST FRYKMAN.

Witnesses:
G. W. KIRKEBY,
HENRY W. PETERSON.

---

Copies of this patent may be obtained for five cents each, by addressing the "Commissioner of Patents, Washington, D. C."